(12) United States Patent
Kim et al.

(10) Patent No.: US 9,094,609 B2
(45) Date of Patent: Jul. 28, 2015

(54) METHOD AND APPARATUS FOR GENERATING IMAGE WITH HIGHLIGHTED DEPTH-OF-FIELD

(75) Inventors: Jaewon Kim, Goyang-si (KR); Ig Jae Kim, Goyang-si (KR); Sang Chul Ahn, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 417 days.

(21) Appl. No.: 13/437,229

(22) Filed: Apr. 2, 2012

(65) Prior Publication Data
US 2012/0249743 A1 Oct. 4, 2012

(30) Foreign Application Priority Data

Mar. 31, 2011 (KR) ........................ 10-2011-0029873

(51) Int. Cl.
*H04N 5/232* (2006.01)
*H04N 5/235* (2006.01)

(52) U.S. Cl.
CPC ......... *H04N 5/23293* (2013.01); *H04N 5/2354* (2013.01); *H04N 5/23229* (2013.01); *H04N 5/23212* (2013.01)

(58) Field of Classification Search
None
See application file for complete search history.

(56) References Cited

U.S. PATENT DOCUMENTS

| | | | | |
|---|---|---|---|---|
| 4,958,180 A * | 9/1990 | Matsui et al. | ................. | 396/109 |
| 5,313,246 A * | 5/1994 | Takagi et al. | ................. | 396/122 |
| 5,428,420 A * | 6/1995 | Akashi et al. | ................. | 396/111 |
| 5,485,241 A * | 1/1996 | Irie et al. | .......................... | 396/51 |
| 5,850,578 A * | 12/1998 | Ohmura | ....................... | 396/109 |
| 5,926,655 A * | 7/1999 | Irie et al. | .......................... | 396/51 |
| 6,311,019 B1 * | 10/2001 | Ide | ................... | 396/95 |
| 7,103,212 B2 * | 9/2006 | Hager et al. | ................. | 382/154 |
| 2001/0000126 A1 * | 4/2001 | Kinjo | ............................ | 348/218 |
| 2001/0041073 A1 * | 11/2001 | Sorek et al. | .................... | 396/431 |
| 2003/0063212 A1 * | 4/2003 | Watanabe et al. | ............ | 348/349 |
| 2009/0102960 A1 * | 4/2009 | Tsuchiya | ..................... | 348/345 |

(Continued)

FOREIGN PATENT DOCUMENTS

| | | |
|---|---|---|
| JP | 2001-119623 | 4/2001 |
| JP | 2011-130169 | 6/2001 |
| KR | 10-2011-0038373 | 4/2011 |

OTHER PUBLICATIONS

Scharstein, D., et al., "High-accuracy stereo depth maps using structured light," Computer Vision and Pattern Recognition, 2003. Proceedings. 2003 IEEE Computer Society Conference on , vol. 1, No., pp. I-195,I-202 vol. 1, Jun. 18-20, 2003.*

(Continued)

*Primary Examiner* — Sath V Perungavoor
*Assistant Examiner* — Peter D Le
(74) *Attorney, Agent, or Firm* — NSIP Law

(57) ABSTRACT

A method that highlights a depth-of-field (DOF) region of an image and performs additional image processing by using the DOF region. The method includes: obtaining a first pattern image and a second pattern image that are captured by emitting light according to different patterns from an illumination device; detecting a DOF region by using the first pattern image and the second pattern image; determining weights to highlight the DOF region; and generating the highlighted DOF image by applying the weights to a combined image of the first pattern image and the second pattern image.

19 Claims, 14 Drawing Sheets

(56) References Cited

U.S. PATENT DOCUMENTS

| | | | |
|---|---|---|---|
| 2010/0171764 A1* | 7/2010 | Feng et al. | 345/660 |
| 2010/0182406 A1* | 7/2010 | Benitez | 348/46 |
| 2010/0302433 A1* | 12/2010 | Egawa | 348/345 |
| 2010/0315490 A1* | 12/2010 | Kim et al. | 348/47 |
| 2011/0019015 A1* | 1/2011 | Takanashi | 348/208.6 |
| 2011/0102663 A1* | 5/2011 | Ichimiya | 348/345 |

OTHER PUBLICATIONS

Joaquim Salvi, et al., "Pattern codification strategies in structured light systems," Institut d'Informatica i Aplicacions, Universitat de Girona, Girona, Spain Oct. 2, 2003.*

Notice of Allowance issued Nov. 23, 2012 in counterpart Korean Patent Application No. 10-2011-0029873 (5 pages, in Korean).

* cited by examiner

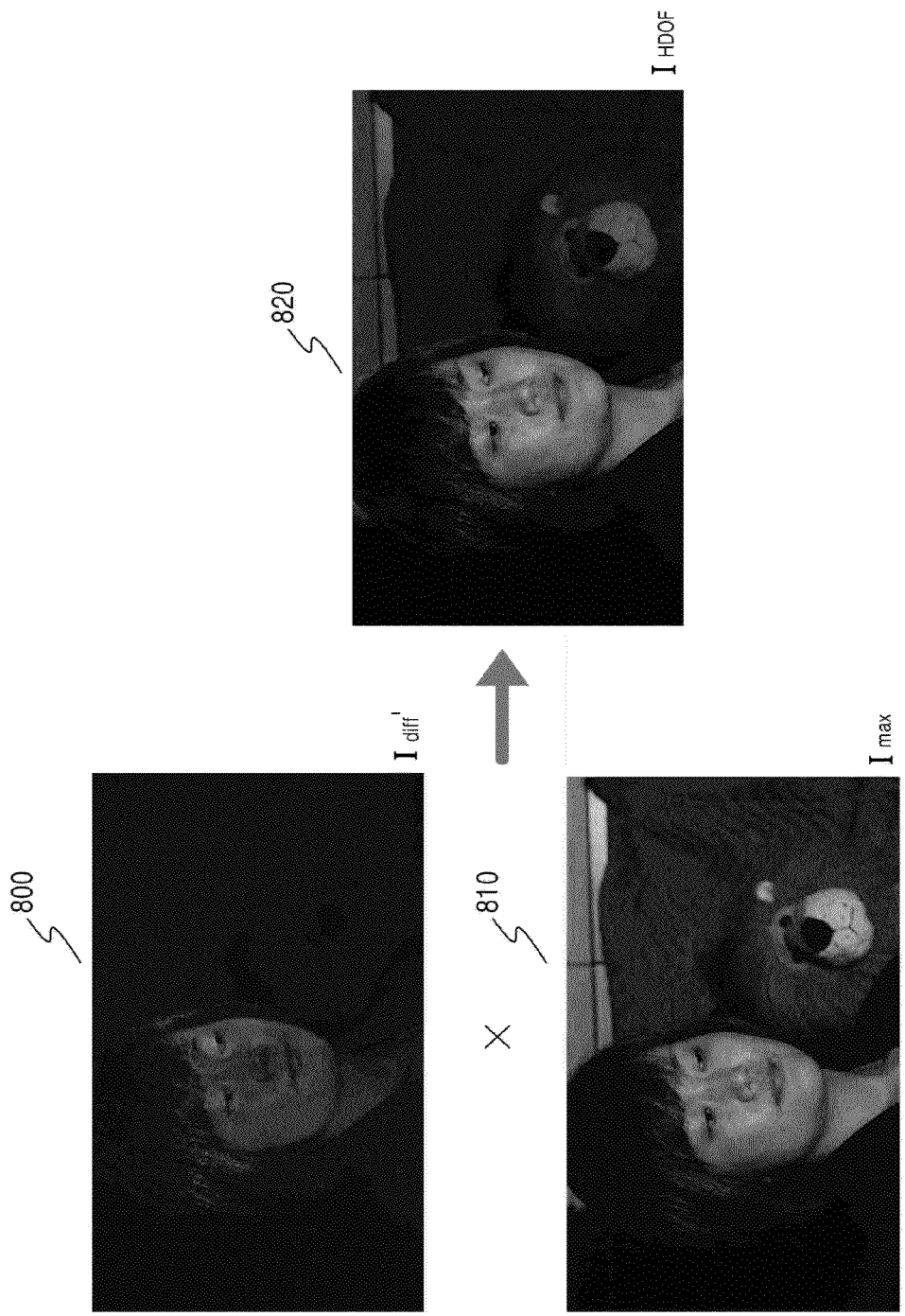

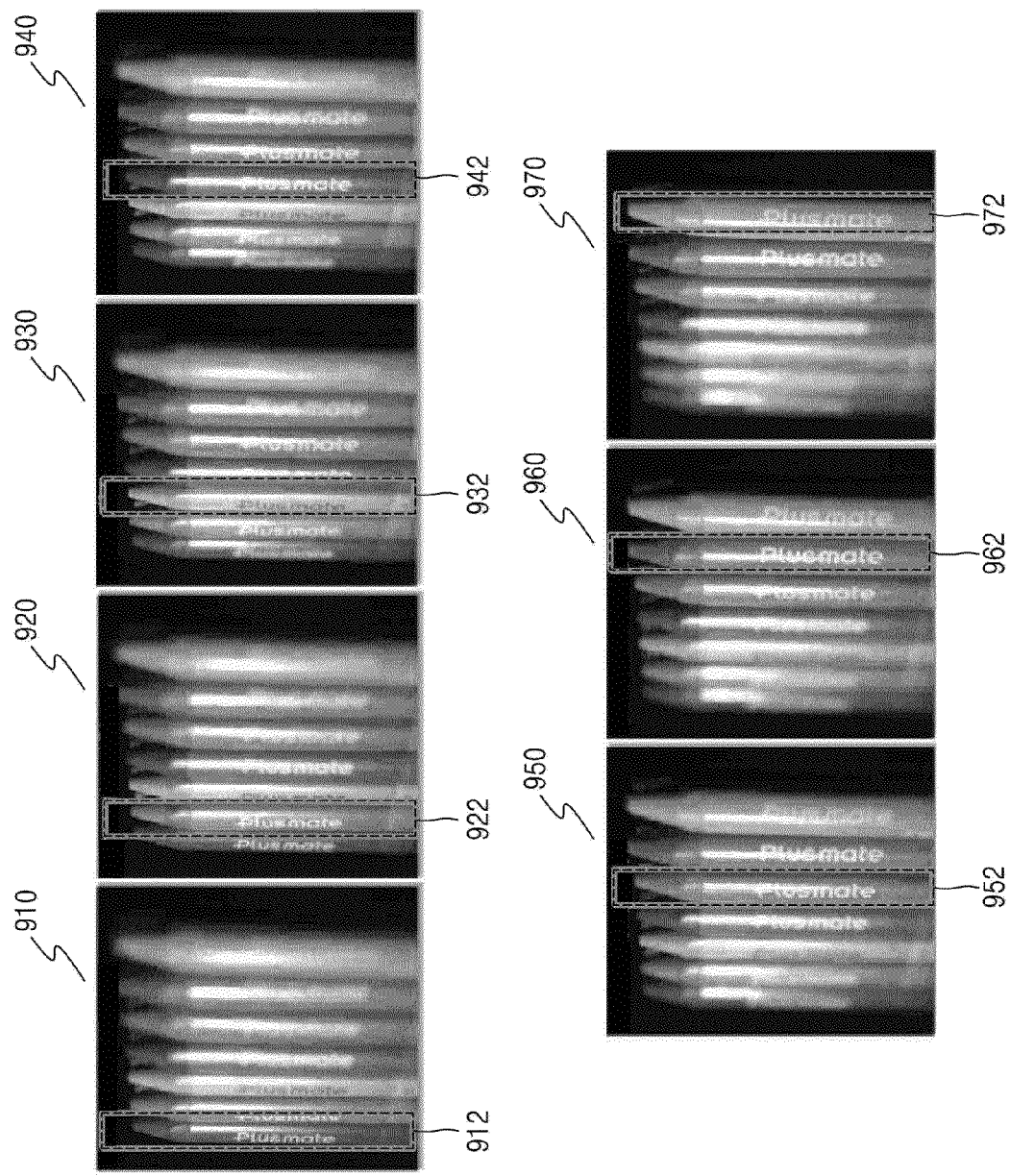

METHOD AND APPARATUS FOR GENERATING IMAGE WITH HIGHLIGHTED DEPTH-OF-FIELD

CROSS-REFERENCE TO RELATED PATENT APPLICATION

This application claims the benefit of Korean Patent Application No. 10-2011-0029873, filed on Mar. 31, 2011, in the Korean Intellectual Property Office, the disclosure of which is incorporated herein in its entirety by reference.

BACKGROUND OF THE INVENTION

1. Field of the Invention

The present invention relates to a method of detecting a depth-of-field (DOF) region and performing image processing by using the DOF region.

2. Description of the Related Art

A depth-of-field (DOF) refers to a range of distance between a nearest subject and a farthest subject in a scene that appear acceptably sharp in an image captured by a camera lens. In the image captured by the camera lens, a region within the DOF may appear to be in focus. Accordingly, even when a specific subject within the DOF is focused, another subject within the DOF may also appear to be focused.

From among subjects in an image, since a subject within a DOF appears clear whereas a subject outside the DOF appears relatively unclear, there is a clarity difference between the subject within the DOF and the subject outside the DOF. Therefore, an image processing technique which utilizes an image characteristic where a region corresponding to a DOF has higher clarity than remaining regions or an image processing technique for highlighting a clarity difference between a region corresponding to a DOF and remaining regions have been generally employed.

SUMMARY OF THE INVENTION

The present invention provides a method and apparatus which may detect a depth-of-field (DOF) region of an image by using an illumination device to emit patterned light and highlight the DOF region to appear more prominent than a non-DOF region. Furthermore, the present invention provides a method and apparatus which may perform additional image processing by using the highlighted region corresponding to the DOF region.

According to an aspect of the present invention, there is provided a method of generating a DOF image, the method including: obtaining a first pattern image and a second pattern image that are captured by emitting light according to different patterns from an illumination device; detecting a DOF region by using the first pattern image and the second pattern image; determining weights to detect and highlight the DOF region; and generating the highlighted DOF image by applying the weights to a combined image of the first pattern image and the second pattern image. The generation of the highlighted DOF image may include: comparing pixels of the first pattern image and the second pattern image at the same position and generating the combined image composed of pixels having larger pixel values.

According to another aspect of the present invention, there is provided an apparatus for generating a highlighted DOF image, the apparatus including: an illumination device that emits light according to different patterns; a pattern image obtaining unit that obtains a first pattern image and a second pattern image that are captured by using the illumination device; and a highlighted DOF image generating unit that generates the highlighted DOF image by detecting a DOF region which is determined from weights, comparing pixels of the first pattern image and the second pattern image at the same position to calculate the weights, and applying the weights to a combined image composed of pixels having larger pixel values.

BRIEF DESCRIPTION OF THE DRAWINGS

The above and other features and advantages of the present invention will become more apparent by describing in detail exemplary embodiments thereof with reference to the attached drawings in which:

FIG. 8 is a view for explaining a process of generating a highlighted DOF image;

FIGS. 9A and 9B illustrate results obtained after comparing highlighted DOF images with general images according depths of subjects;

DETAILED DESCRIPTION OF THE INVENTION

Expressions such as "at least one of," when preceding a list of elements, modify the entire list of elements and do not modify the individual elements of the list.

The present invention will now be described more fully with reference to the accompanying drawings, in which exemplary embodiments of the invention are shown.

Figure 1:
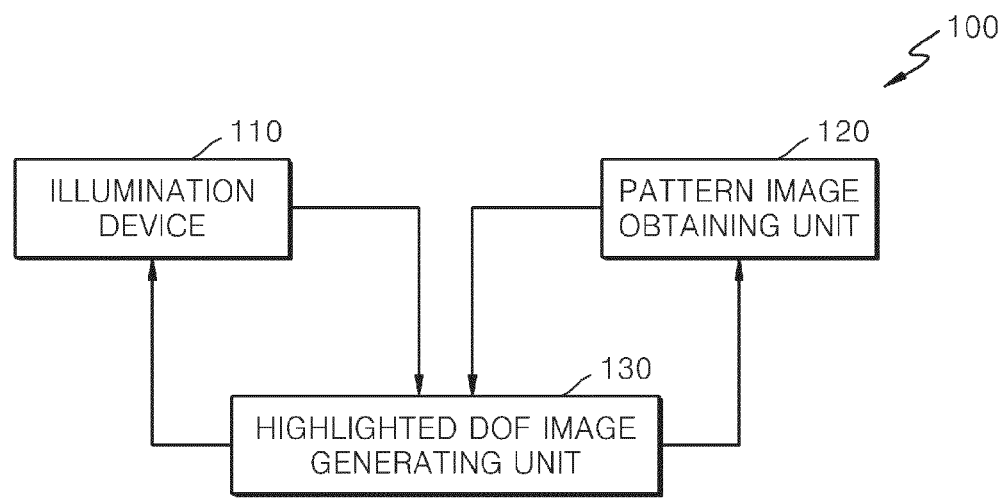
FIG. 1 is a block diagram illustrating an apparatus for generating a highlighted depth-of-field (DOF) image, according to an embodiment of the present invention.

FIG. 1 is a block diagram illustrating an apparatus 100 for generating an image with a highlighted depth-of-field (DOF), according to an embodiment of the present invention.

Referring to FIG. 1, the apparatus 100 includes an illumination device 110, a pattern image obtaining unit 120, and a highlighted DOF image generating unit 130.

Since a region within a DOF (referred to as a DOF region) of an image appears to be in focus, a DOF region and an in-focus region may be interchangeably used herein.

The illumination device 110 emits light, and the pattern image obtaining unit 120 obtains an image by photographing a subject by using the light emitted by the illumination device 110.

The illumination device 110 emits light according to a pattern. The illumination device 110 may emit light according to various patterns. The pattern image obtaining unit 120 may obtain an image by using patterned light emitted by the illumination device 100 according to a pattern. For convenience of explanation, an image obtained by photographing a subject that is illuminated according to a pattern will be referred to as a 'pattern image', and an image with a highlighted DOF will be referred to as a 'highlighted DOF image'.

If the illumination device 110 emits patterned light according to two different patterns, that is, first and second patterns, the pattern image obtaining unit 120 may obtain a first pattern image that is captured when patterned light is emitted according to the first pattern and a second pattern image that is captured when patterned light is emitted according to the second pattern. Accordingly, the pattern image obtaining unit 120 may obtain two images, that is, the first pattern image and the second pattern image, by photographing one subject that is illuminated according to the two different patterns, that is, the first and second patterns, when a DOF is fixed.

The illumination device 110 may include a light-emitting device such as a projector or a flash of a camera. Each pattern of the illumination device 110 may be a checkerboard pattern in which blocks having the same size are alternately arranged. The two different patterns may be patterns in which positions of blocks that transmit light therethrough and blocks that don't transmit light are reversed.

The highlighted DOF image generating unit 130 detects a region within the DOF, that is, a DOF region, of the camera that captures the first pattern image and the second pattern image by using the first pattern image and the second pattern image obtained by the pattern image obtaining unit 120. The highlighted DOF image generating unit 130 may detect the DOF region of the camera that captures the first pattern image and the second pattern image by using a difference image between the first pattern image and the second pattern image that are captured by illuminating the subject according to the patterns in which positions of blocks are reversed.

The highlighted DOF image generating unit 130 determines weights for distinguishing the DOF region from a non-DOF region. The highlighted DOF image generating unit 130 may determine weights for pixels of the entire image.

The weights may be determined as pixel values of an image obtained by normalizing the difference image between the first pattern image and the second pattern image. The weights may be equal to or greater than 0 and equal to or less than 1.

The highlighted DOF image generating unit 130 generates a highlighted DOF image by applying the weights to a combined image of the first pattern image and the second pattern image. The highlighted DOF image generating unit 130 may generate the highlighted DOF image by comparing the first pattern image with the second pattern image, selecting a pixel having a larger pixel value from among pixels of the first pattern image and the second pattern image at the same position, and multiplying the weights on a pixel by pixel basis by the larger pixel value of the selected pixel.

The apparatus 100 may generate a binary image of the highlighted DOF image and perform additional image processing on the highlighted DOF image by using the binary image. The apparatus 100 may perform image segmentation, alpha matting, or image synthesis as the additional image processing by using the binary image of the highlighted DOF image.

Figure 2:
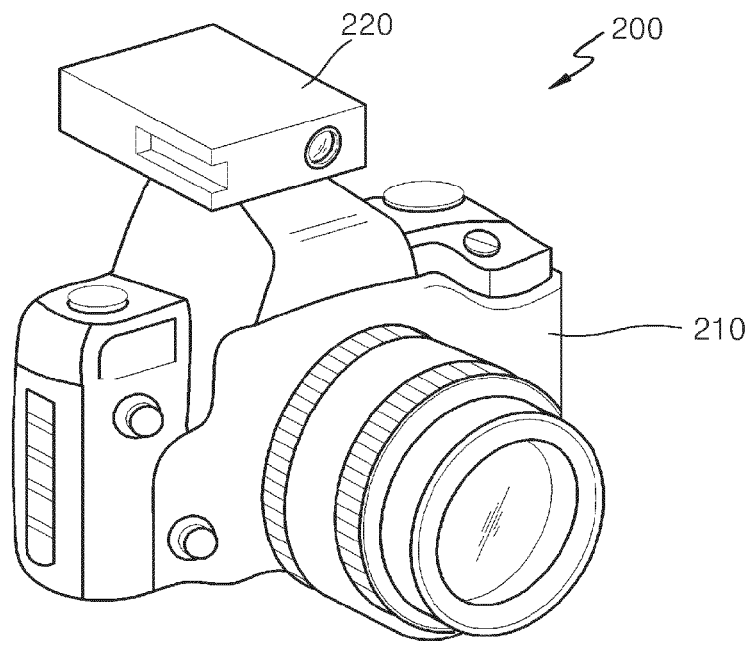
FIG. 2 is a perspective view illustrating a digital camera for embodying the apparatus of FIG. 1.
Figure 3:
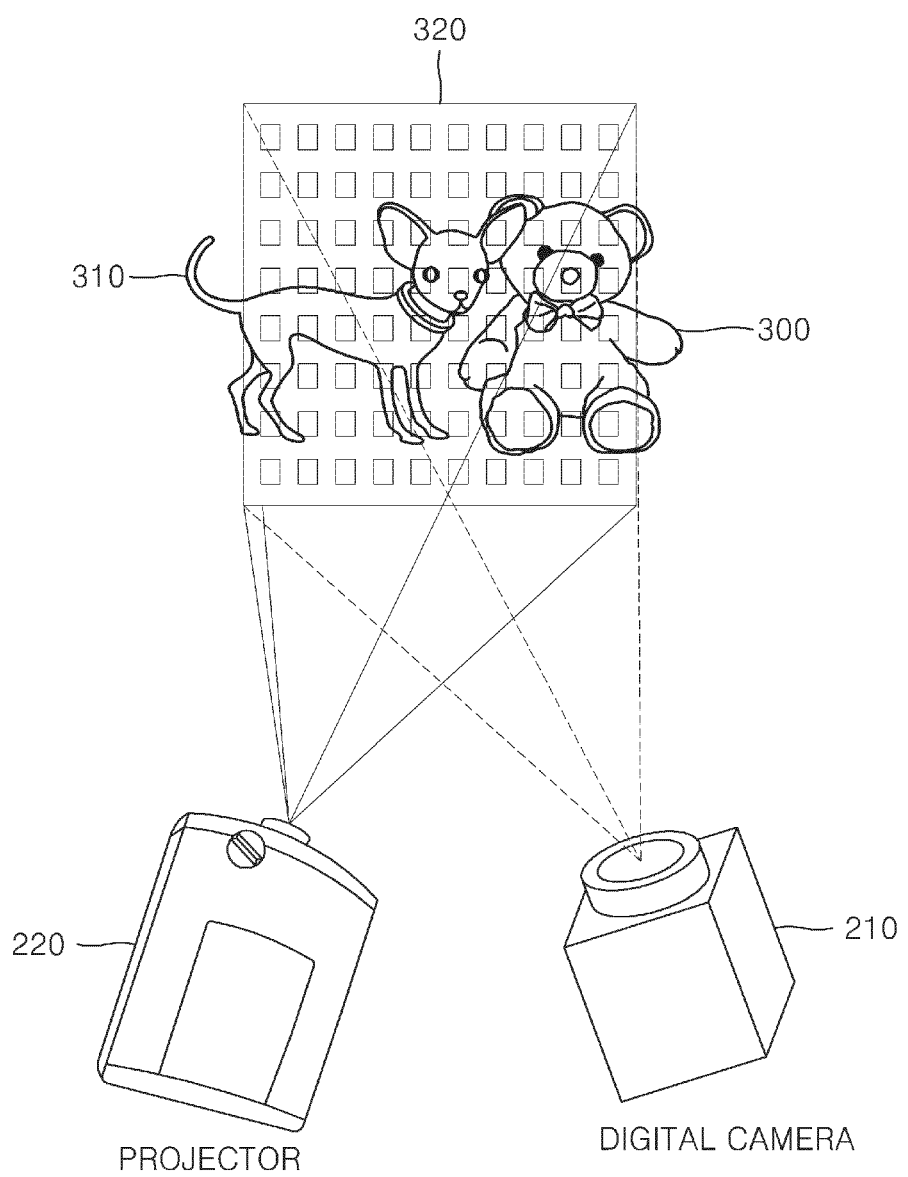
FIG. 3 is a view for explaining an example where a pattern image is obtained by using a pattern of a projector.

FIG. 2 is a perspective view illustrating a digital camera 210 for embodying the apparatus 100 of FIG. 1. FIG. 3 is a view for explaining an example where a pattern image is obtained by using a pattern of a projector 220.

In order to embody the apparatus 100 of FIG. 1, the projector 220 may be mounted as the illumination device 110 on the digital camera 210. Since the illumination device 110 emits light in order for the digital camera 210 to capture an image, the illumination device 110 may include a device for instantaneously emitting a considerable amount of light such as a flash. Although the projector 220 is mounted on the digital camera 210 in FIG. 2, the present embodiment is not limited thereto and the illumination device 110 may be embodied in the digital camera 210 or may be separately provided from the digital camera 210.

The projector 220 may directly emit patterned light according to a checkerboard pattern to subjects 300 and 310. While the projector 220 emits patterned light according to the checkerboard pattern, the pattern image obtaining unit 110 may photograph the subjects 300 and 310. Also, while the projector 220 emits patterned light according to two different patterns, that is, first and second patterns, the pattern image obtaining unit 110 may obtain a first pattern image that is captured according to the first pattern and a second pattern image that is captured according to the second pattern by photographing the subjects 300 and 310.

The digital camera 210 may have a hardware structure for embodying the pattern image obtaining unit 120 and the highlighted DOF image generating unit 130. Alternatively, the digital camera 210 may include therein a chipset embodying a logical circuit or a computer processing module for operating the apparatus 100 in a software-implemented method.

Like the projector 220, in order to emit patterned light according to a pattern, the illumination device 110 may directly emit light according to a pattern. Also, a pattern layer formed of a light-transmissive material and having a pattern such as a film may be manufactured and disposed in front of a light-emitting unit of the illumination device 110. Accordingly, light emitted from the light-emitting unit may be emitted according to the pattern by passing through the pattern layer.

The illumination device 110 may have any of various patterns. The pattern of the illumination device 110 may be changed, or the pattern of the pattern layer disposed in front of the illumination device 110 may be changed.

The pattern of the illumination device 110 or the pattern of the pattern layer disposed in front of the illumination device 110 may be changed under the control of the digital camera 210 or the highlighted DOF image generating unit 130.

Figure 4:
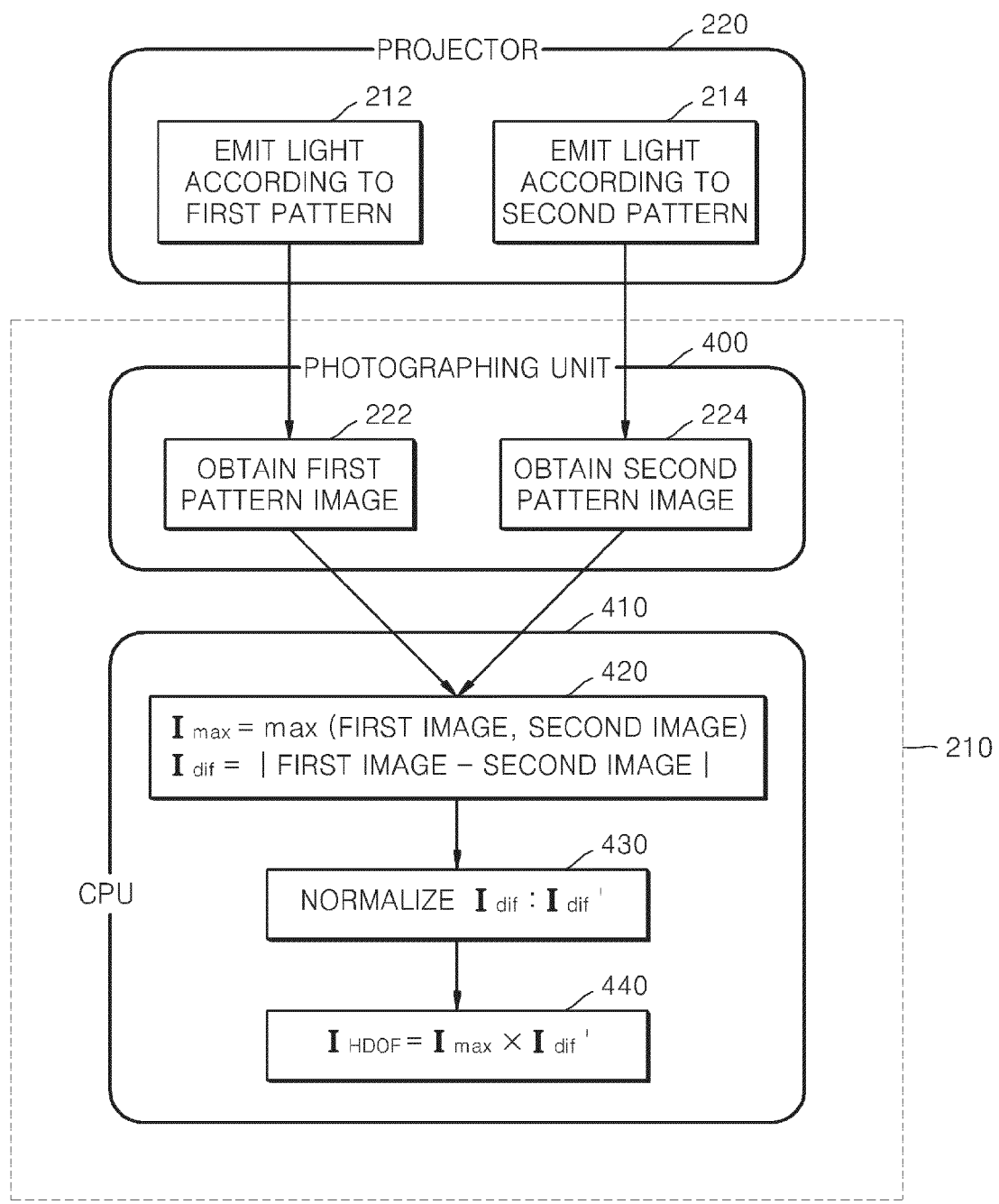
FIG. 4 is a flowchart illustrating an operation of the apparatus of FIG. 1 for generating a highlighted DOF image.

FIG. 4 is a flowchart illustrating an operation of the apparatus 100 of FIG. 1 for generating a highlighted DOF image.

The projector 220 may emit patterned light according to first and second patterns, and a photographing unit 400 of the digital camera 210 may obtain an image by photographing a subject that is illuminated by the projector 220. That is, in operation 212, the projector 220 emits patterned light according to the first pattern. In operation 222, the photographing unit 400 may obtain a first pattern image by photographing the subject to which the patterned light is emitted according to the first pattern. Likewise, in operation 214, the projector 220 emits patterned light according to the second pattern. In operation 224, the photographing unit 400 may obtain a second pattern image by photographing the subject to which the patterned light is emitted according to the second pattern.

A central processing unit (CPU) 410 of the digital camera 210 may control an operation of the highlighted DOF image generating unit 130 for generating a highlighted DOF image.

In operation 420, the CPU 410 may determine a DOF region of the first pattern image and the second pattern image that are captured based on different patterns, that is, the first and second patterns. The CPU 410 may detect the DOF region of the first pattern image and the second pattern image by comparing the first pattern image with the second pattern image at every pixel position, determining a combined image $I_{max}$ composed of pixels having larger pixel values, and generating a difference image $I_{diff}$ between the first pattern image and the second pattern image.

In operation 430, the CPU 410 may generate a weight image $I_{diff}'$ by normalizing the difference image $I_{diff}$ between the first pattern image and the second pattern image.

Weights may be determined to be equal to or greater than 0 and equal to or less than 1 by normalizing the difference image $I_{diff}$ between the first pattern image and the second pattern image which shows the DOF region of the first pattern image and the second pattern image. The weight image $I_{diff}'$ may be generated by dividing pixel values of the difference image $I_{diff}$ by a maximum value from among difference values of the first pattern image and the second pattern image, that is, a maximum value from among the pixel values of the difference image $I_{diff}$. Each pixel value of the weight image $I_{diff}'$ may be determined as each weight for pixels of the combined image $I_{max}$ of the first pattern image and the second pattern image.

In operation 440, a highlighted DOF image $I_{HDOF}$ may be generated by combining the combined image $I_{max}$ with the weight image $I_{diff}'$. That is, the highlighted DOF image $I_{HDOF}$ may be output as an image obtained by multiplying the each pixel value (weight) of the weight image $I_{diff}'$ by each pixel value of the combined image $I_{max}$ of the first pattern image and the second pattern image (that is, a larger pixel value from among pixels of the first pattern image and the second pattern image).

A method of determining weights of the difference image $I_{diff}$ in operation 430 may include performing linear normalization that divides the difference image $I_{diff}$ between the first pattern image and the second pattern image by a maximum value of the difference image $I_{diff}$. Also, the method of determining weights of the difference image $I_{diff}$ in operation 430 may involve adjusting weights according to regions in order to adjust a degree to which the DOF region is highlighted further than a non-DOF region of the first pattern image and the second pattern image.

For example, weights for the non-DOF region of a weight image $I_{diff}''$ may be adjusted to be lower than those for the non-DOF region of the weight image $I_{diff}''$ and weights for the DOF region of the weight image $I_{diff}''$ may be adjusted to be higher than those for the DOF region of the weight image $I_{diff}'$. Accordingly, in a highlighted DOF image $I_{HDOF}'$ obtained by multiplying the weight image $I_{diff}''$ by the combined image $I_{max}$ of the first pattern image and the second pattern image, the non-DOF region is darker and the DOF region is brighter than those in the highlighted DOF image $I_{HDOF}$. Accordingly, the DOF region of the highlighted DOF image $I_{DOF}'$ may be highlighted further than the highlighted DOF image $I_{HDOF}$.

Figure 5:
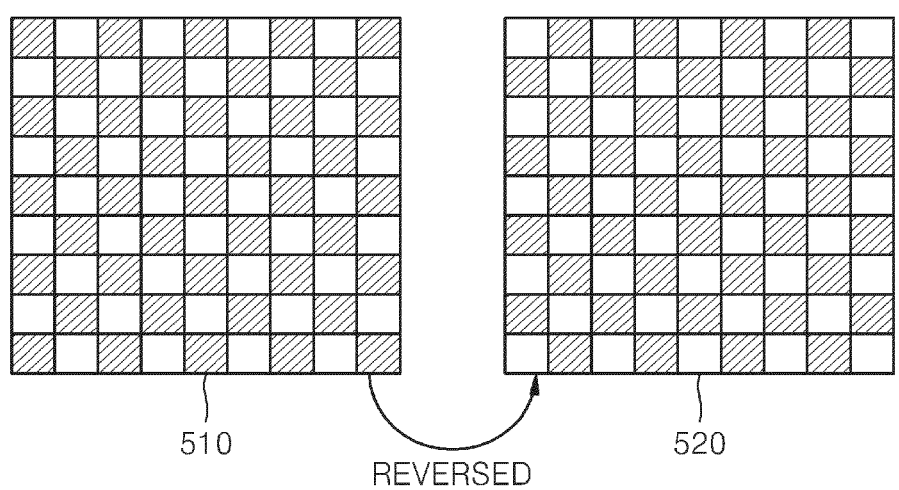
FIG. 5 illustrates patterns of an illumination device.

FIG. 5 illustrates patterns 510 and 520 of the illumination device 110.

The illumination device 110 may illuminate subjects by using the patterns 510 and 520 which are different, and the pattern image obtaining unit 120 may obtain pattern images based on the patterns 510 and 520. In each of the patterns 510 and 520, black blocks don't transmit light and white blocks transmit light therethrough. That is, the patterns 510 and 520 are patterns in which positions of the white blocks that transmit light therethrough and the black blocks that don't transmit light are reversed.

In particular, in order for the pattern image obtaining unit 120 to process the pattern images and distinguish a DOF region from a non-DOF region in the pattern images, the illumination device 110 may illuminate the subjects by using the patterns 510 and 520 in which the positions of the white blocks that transmit light therethrough and black blocks that don't transmit light are reversed.

Figure 6:
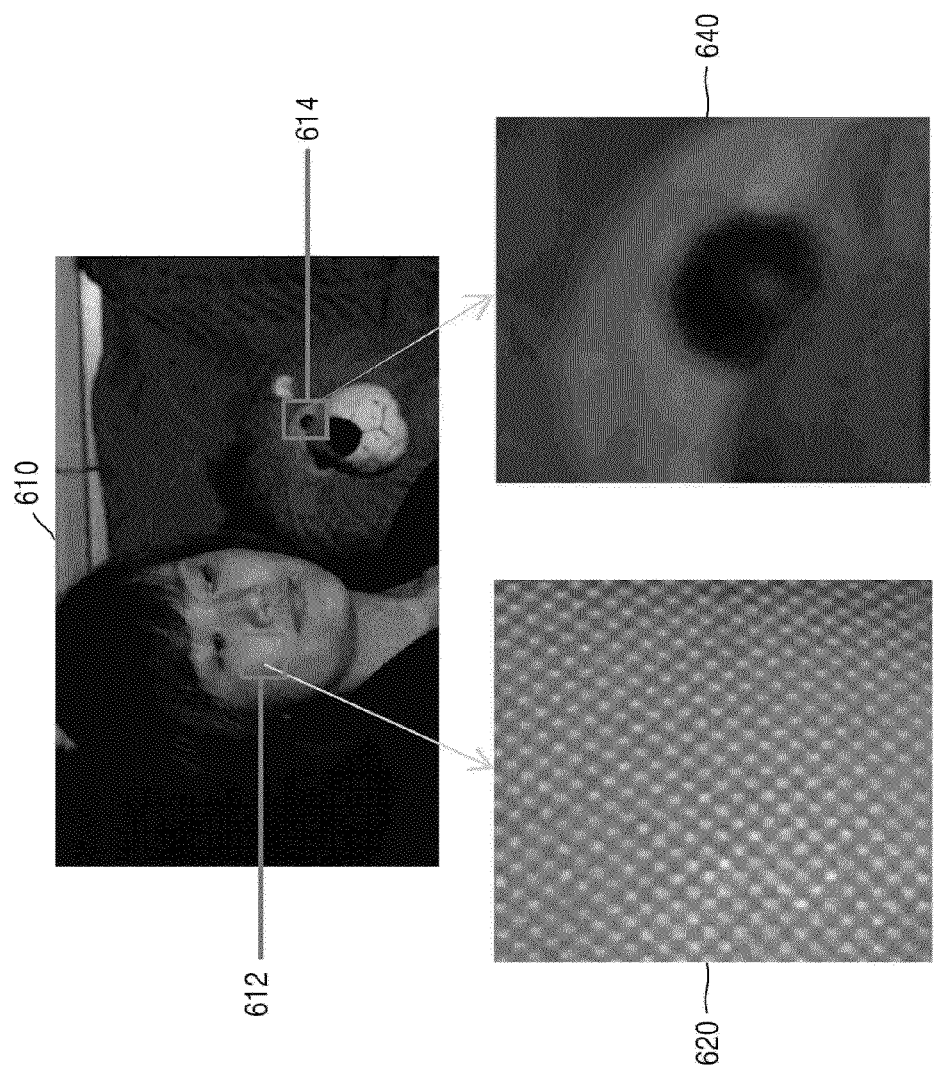
FIG. 6 is a view for explaining a difference between a DOF region and a non-DOF region of an image.

FIG. 6 is a view for explaining a difference between a DOF region and a non-DOF region of an image.

An original image 610 is an image that is captured according to a DOF of the apparatus 100 under illumination with one of the checker patterns. Since a person's face is focused in the original image 610, a face region of the original image 610 is a DOF region. The apparatus 100 may capture a pattern image of a subject in the original image 610 by emitting patterned light according to the patterns 510 and 520 when a DOF of the apparatus 100 is fixed.

A first magnified image 620 of the pattern image is an image obtained by magnifying a portion 612 of the face region, which is the DOF region of the original image 610, in the pattern image. In the first magnified image 620 of the pattern image, dark and bright squares are alternately shown at predetermined intervals according to the patterns 510 and 520.

However, a second magnified image 640 of the pattern image is an image obtained by magnifying a portion 614 of a stuffed lion region which is a non-DOF region of the original image 610, in the pattern image. In the second magnified image 640 of the pattern image, the patterns 510 and 520 are not shown due to blurring and there exists only an unclear representation.

That is, while the DOF region of the pattern image is affected by the patterns 510 and 520, the non-DOF region is hardly affected by the patterns 510 and 520. In particular, in pattern images obtained according to the patterns 510 and 520 which are reversed, pixel values in the DOF region are also reversed according to the patterns 510 and 520.

Figure 7:
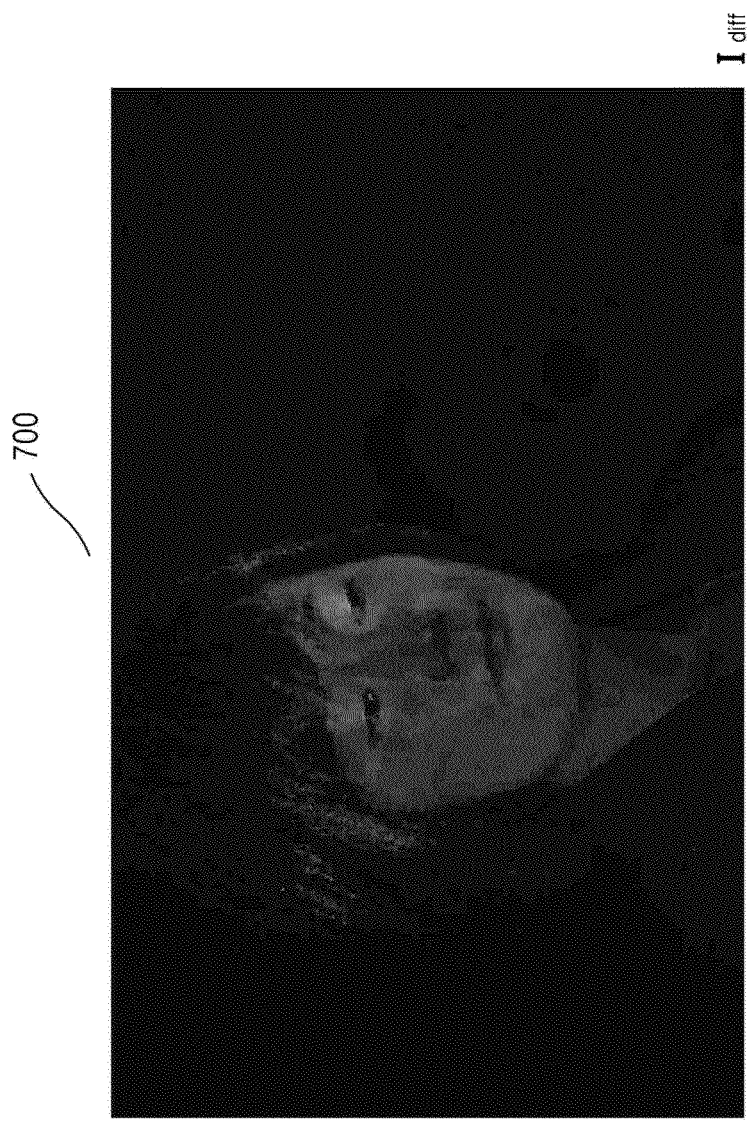
FIG. 7 illustrates a DOF region.

FIG. 7 illustrates a DOF region.

In a first pattern image and a second pattern image that are captured respectively according to the patterns 510 and 520, since the patterns 510 and 520 are shown in a DOF region, positions of darkness and brightness may be reversed in the DOF region of the first pattern image and the second pattern image. However, the patterns 510 and 520 are hardly shown in a non-DOF region of the first pattern image and the second pattern image.

The highlighted DOF image generating unit 130 may detect a DOF region of the first pattern image and the second pattern image by using image characteristics which occur in the first and second pattern images according to the patterns 510 and 520 which are reversed.

The highlighted DOF image generating unit 130 may generate a difference image $I_{diff}$ 700 between the first pattern image and the second pattern image. Since blackness and whiteness may be reversed in the DOF region of the first pattern image and the second pattern image, difference values between pixel values of the first pattern image and the second pattern image in the DOF region are significant values.

On the contrary, since there exists an unclear representation in the non-DOF region of the first pattern image and the second pattern image irrespective of the patterns 510 and 520, difference values between pixel values of the first pattern image and the second pattern image in the non-DOF region are very small.

Accordingly, since the DOF region and the non-DOF region are clearly distinguished by using the difference image $I_{diff}$ 700 between the first and second pattern images that are captured by emitting patterned light according to the patterns 510 and 520 which are reversed, the apparatus 100 may detect the DOF region.

In FIG. 8, the highlighted DOF image generating unit 130 may generate a weight image $I_{diff}'$ 800 by normalizing the difference image $I_{diff}$ 700 between the first and second pattern images.

The highlighted DOF image generating unit 130 may generate a highlighted DOF image $I_{HDOF}$ 820 by generating a combined image $I_{max}$ 810 composed of pixels having larger pixel values from among the first pattern image and the second pattern image and multiplying the weight image $I_{diff}'$ 800 by the combined image $I_{max}$ 810.

A brightness intensity of a face region which is a DOF region in the highlighted DOF image $I_{HDOF}$ 820 is higher than that in the original image 610 and a brightness intensity of a stuffed lion region which is a non-DOF region in the highlighted DOF image $I_{HDOF}$ 820 is lower than that in the original image 610. That is, a brightness difference between the DOF region and the non-DOF region is increased.

Accordingly, the DOF region may be highlighted further than the non-DOF region by increasing a brightness difference as well as a focusing difference between the DOF region and the non-DOF region in the highlighted DOF image $I_{HDOF}$ 820.

Figure 9B:
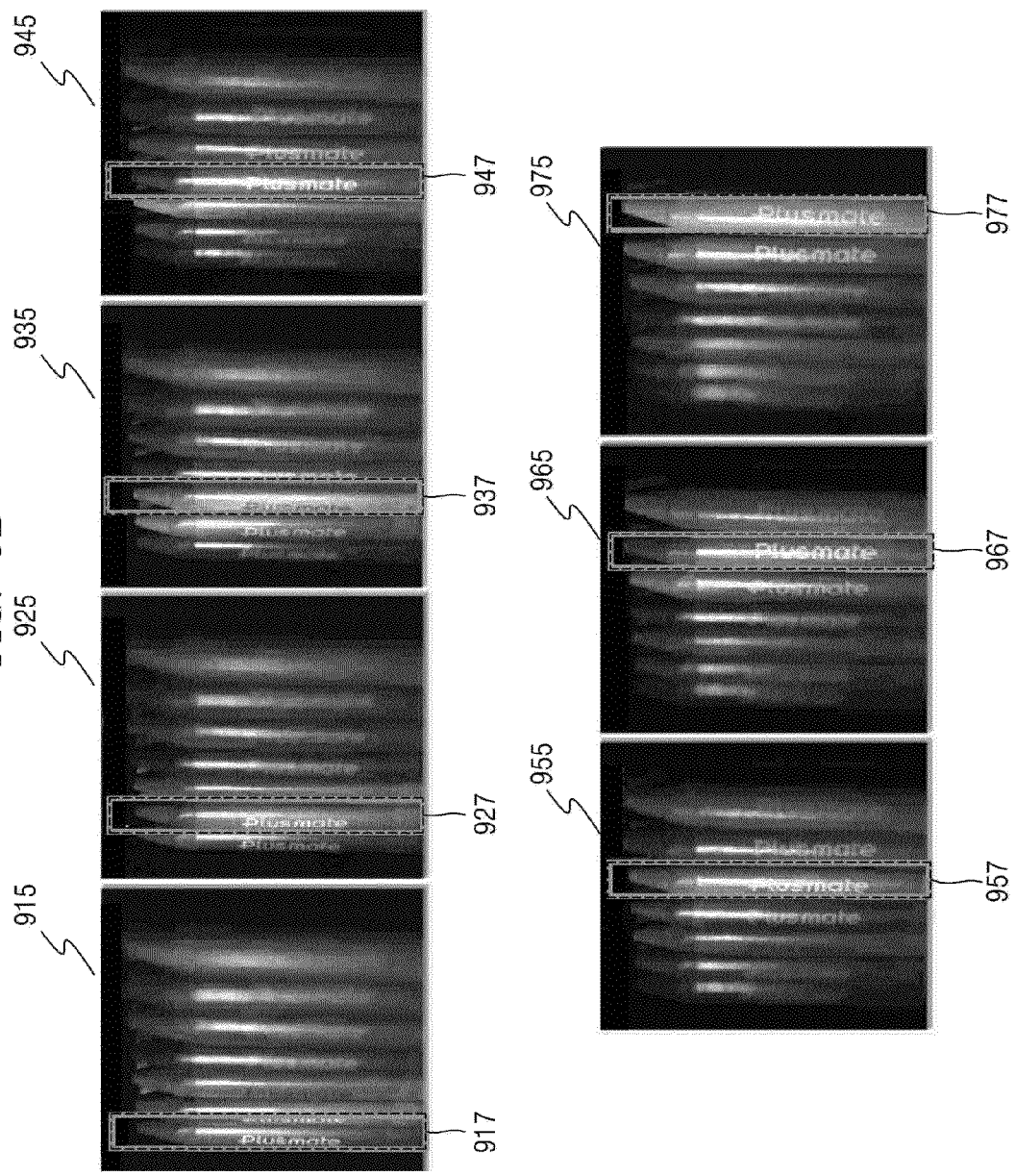

FIGS. 9A and 9B illustrate results obtained after comparing highlighted DOF images with general images according to depths of subjects.

In FIG. 9A, the focused subjects of original images 910, 920, 930, 940, 950, 960, and 970 are seven crayons 912, 922, 932, 942, 952, 962, and 972. The first original image 910 is an image that is captured by focusing on the crayon 912 that is located at a farthest position from a camera. The other original images 910, 920, 930, 940, 950, 960, and 970 are images that are captured by respectively focusing on the crayons 922, 932, 942, 952, 962, and 972 in an order in which the crayons 922, 932, 942, 952, 962, and 972 are located closer to the camera. Accordingly, the crayons 912, 922, 932, 942, 952, 962, and 972 are respectively included in DOF regions of the original images 910, 920, 930, 940, 950, 960, and 970.

In FIG. 9B, highlighted DOF images 915, 925, 935, 945, 955, 965, and 975 are illustrated under the original images 910, 920, 930, 940, 950, 960, and 970 in FIG. 9A.

DOF regions of the highlighted DOF images 915, 925, 935, 945, 955, 965, and 975 are highlighted to become brighter than non-DOF regions of the highlighted DOF images 915, 925, 935, 945, 955, 965, and 975. Accordingly, crayons 917, 927, 937, 947, 957, 967, and 977 which are focused appear to be brighter than crayons in the non-DOF regions.

Figure 10:
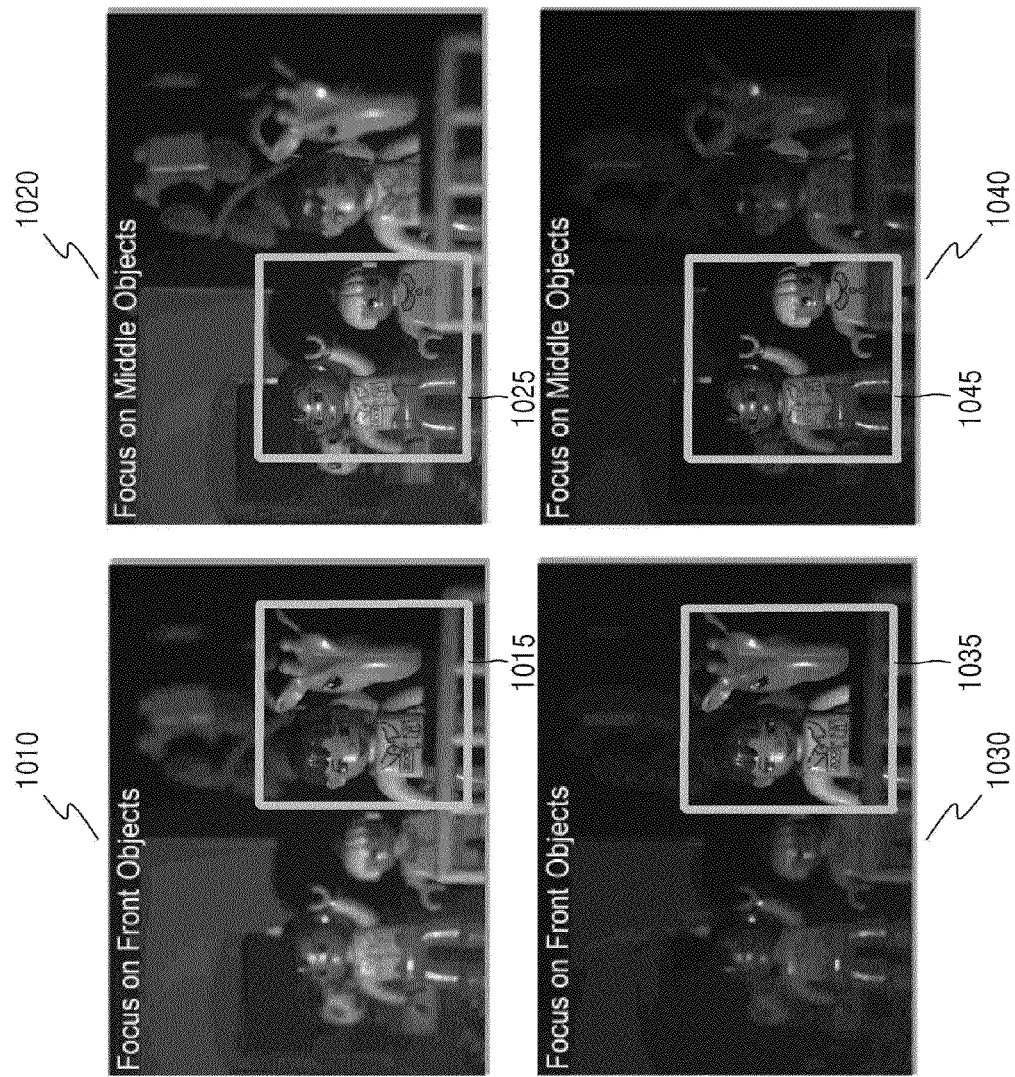
FIG. 10 illustrates results obtained after comparing highlighted DOF images with general images according depths of subjects.

FIG. 10 illustrates results obtained after comparing highlighted DOF images with general images according to depths of subjects.

In FIG. 10, subjects of original images 1010 and 1020 are a plurality of toys. Since toys located on a forward right side of the original image 1010 are focused, a DOF region 1015 includes the toys located on the forward right side. Since toys located on a backward left side of the original image 1020 are focused, a DOF region 1025 includes the toys located on the backward left side.

Highlighted DOF images 1030 and 1040 are illustrated under the original images 1010 and 1020. DOF regions 1035 and 1045 of the highlighted DOF images 1030 and 1040 are highlighted to be brighter than non-DOF regions of the highlighted DOF images 1030 and 1040.

Accordingly, the apparatus 100 may highlight only subjects in DOF region irrespective of whether subjects overlap with one another or are located on right sides or left sides.

Figure 11:
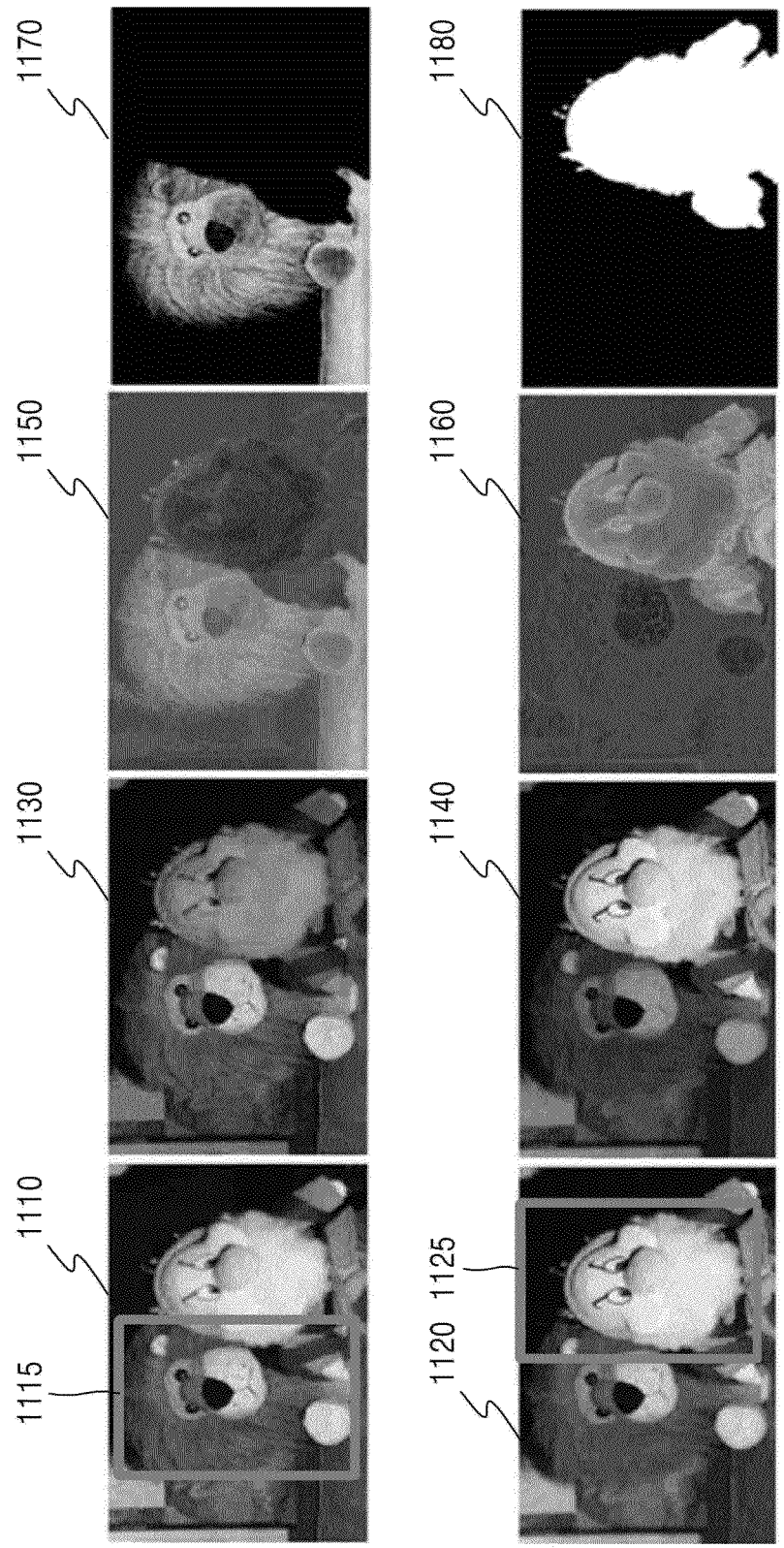
FIGS. 11, 12, and 13 illustrate resultant images obtained after performing additional image processing by using a highlighted DOF image.
Figure 12:
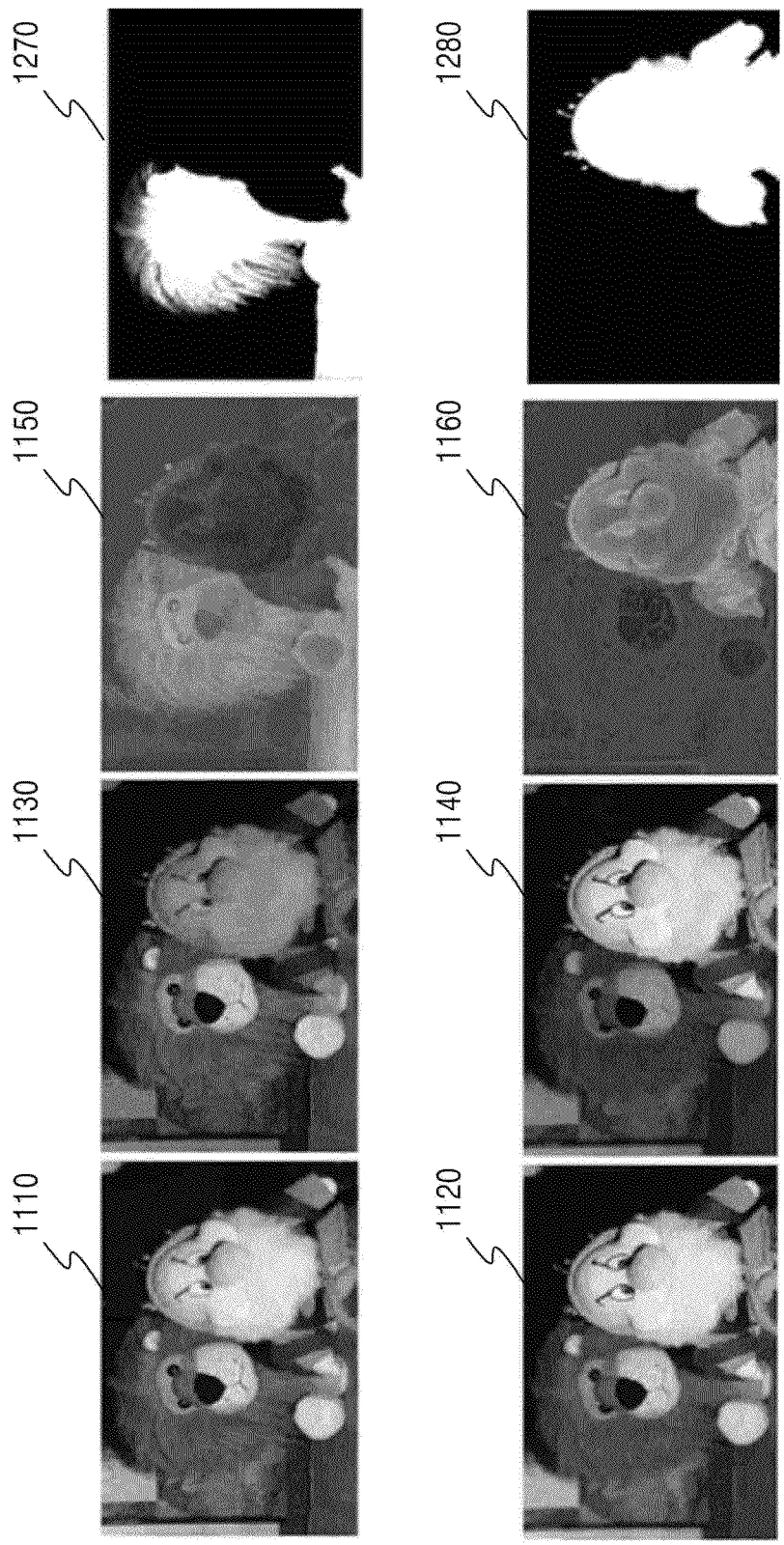
Figure 13:
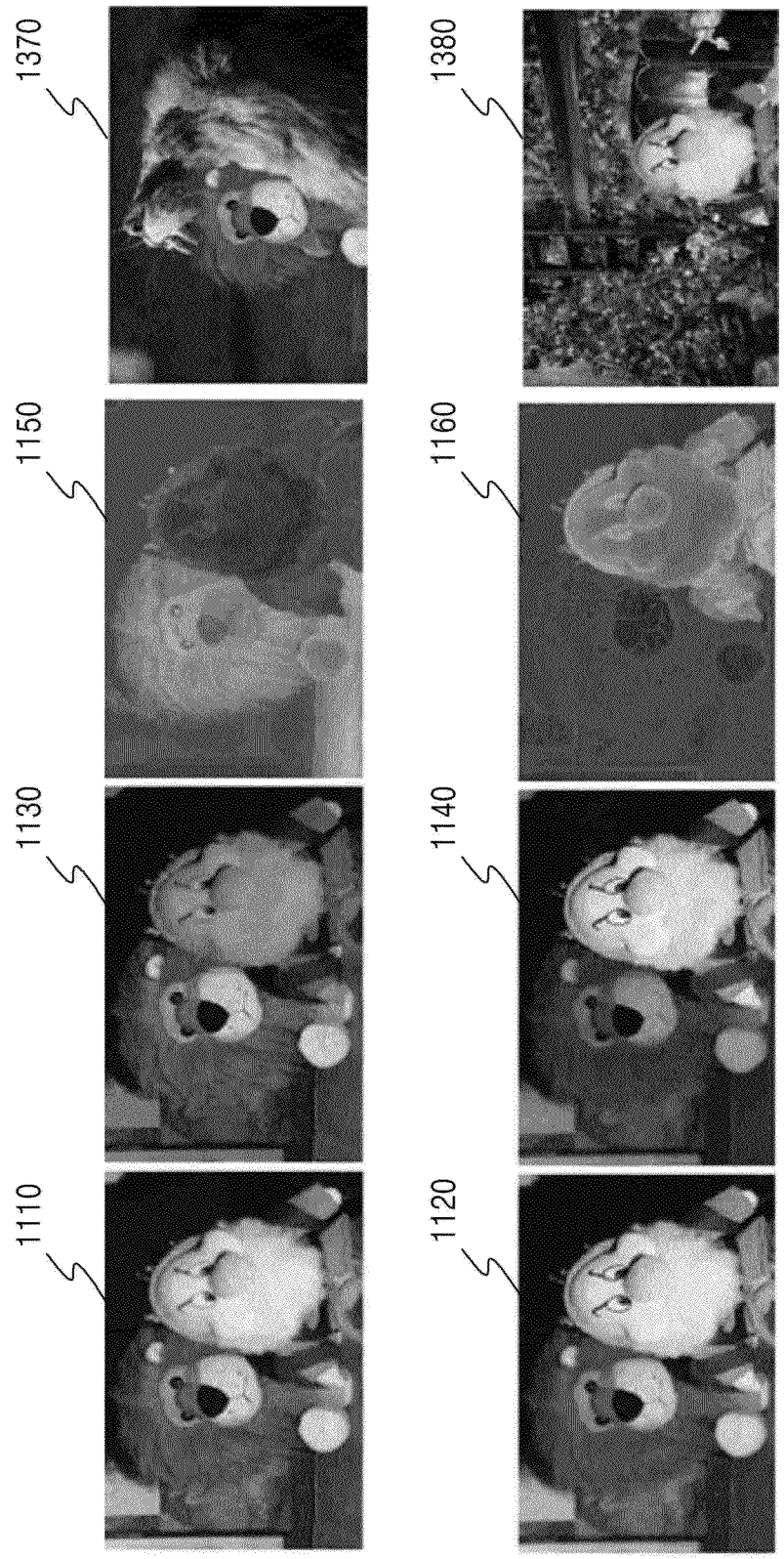

FIGS. 11, 12, and 13 illustrate resultant images obtained after performing additional image processing by using a highlighted DOF image.

The apparatus 100 may binarize a highlighted DOF image $I_{HDOF}$ or a difference image $I_{diff}$ to obtain a binary image. In the binary image of the highlighted DOF image, since a DOF region and a non-DOF region are clearly distinguished from each other, the DOF region may be detected. The apparatus 100 may perform additional image processing by using the binary image of the highlighted DOF image or the DOF region.

In FIGS. 11, 12, and 13, since a stuffed lion 1115 which is a left subject is focused in an original image 1110, a 'stuffed lion' region becomes a DOF region. Since a doll 1125 which is a right subject is focused in an original image 1120, a 'doll' region becomes a DOF region.

According to a method of highlighting a DOF, a highlighted DOF image 1130 of the original image 1110 may be generated. Also, in a difference image 1150 between pattern images of the original image 1110, since a brightness intensity of the stuffed lion region is much higher than a brightness intensity of another region, it may be found that the DOF region of the original image 1110 is the stuffed lion region. Likewise, a highlighted DOF image 1140 of the original image 1120 may be generated and it may be found that the DOF region of the original image 1120 is the doll region by using a difference image 1160 between pattern images.

In FIG. 11, a binary image 1170 in which only the stuffed lion region which is the DOF region of the original image 1110 is displayed may be generated by thresholding the difference image 1150 between the pattern images of the original image 1110 with a predetermined threshold value. Accordingly, image segmentation may be performed such that only the stuffed lion region which is the DOF region of the original image 1110 is separated from other regions.

Likewise, a binary image 1180 in which only the doll region which is the DOF region of the original image 1120 is displayed may be generated by thresholding the difference image 1160 between the pattern images of the original image 1120 with a predetermined threshold value, and only the doll region which is the DOF region of the original image 1120 may be separated from other regions.

In FIG. 12, alpha matting that creates the appearance of partial or full transparency for a target subject may be performed. Alpha matting is often useful to naturally combine an image with a background image, and combine multiple 2D images into a single, final image. An alpha matting image 1270 in which all regions other than the stuffed lion region are processed to be transparent may be generated from the binary image 1170 in which only the stuffed lion region which is the DOF region of the original image 1110 is displayed. An alpha matting image 1280 in which all regions other than the doll region are processed to be transparent may be generated from the binary image 1180 in which only the doll region which is the DOF region of the original image 1110 is displayed.

In FIG. 13, image synthesis that combines a subject region with another image by using an image in which only the subject region that is focused is separated may be performed. Regions other than the stuffed lion may be processed to be transparent in the alpha matting image 1270 because the stuffed lion is a focused subject in the original image 1110. Accordingly, a combined image 1370 may be generated by naturally combining the stuffed lion region with another image.

Likewise, due to the original image 1120 in which the doll is a focused subject, regions other than the doll may be processed to be transparent in the alpha matting image 1280. Thus, a combined image 1380 may be generated by naturally combining the doll region which is the DOF region with another image by using the original image 1120 and the alpha matting image 1280.

Accordingly, the apparatus 100 may perform additional image processing such as image segmentation, alpha matting, or image synthesis on a DOF region by using a binary image that clearly indicates the DOF region.

Figure 14:
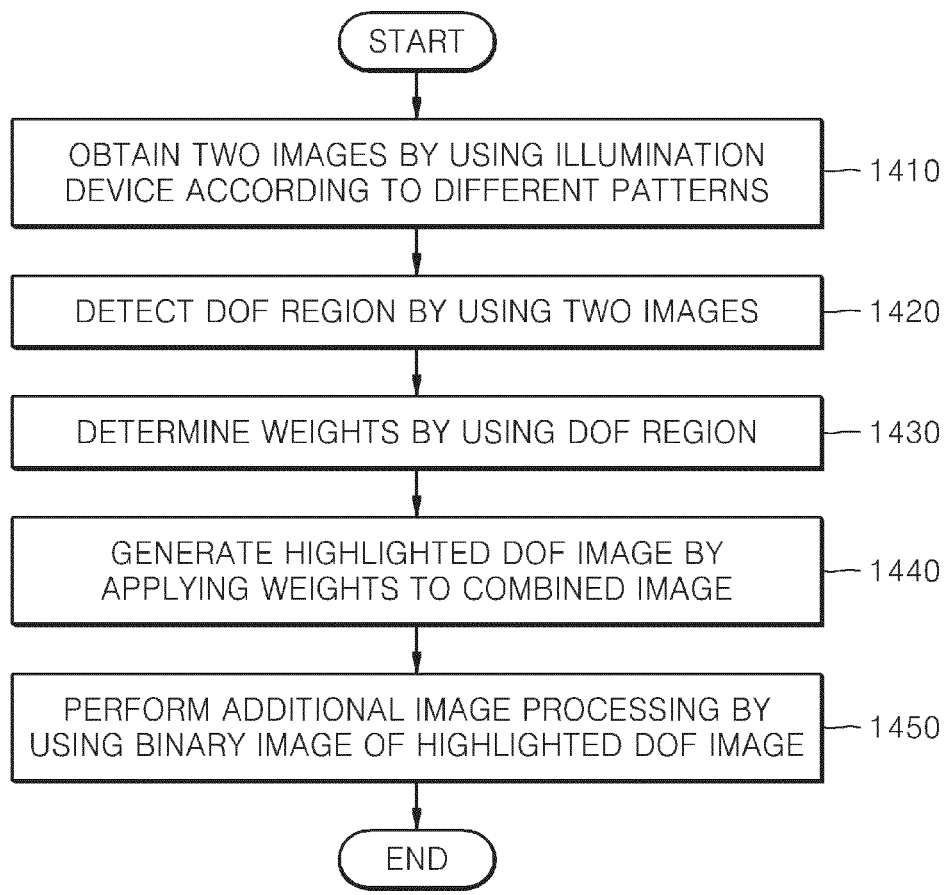
FIG. 14 is a flowchart illustrating a method of generating a highlighted DOF image, according to an embodiment of the present invention.

FIG. 14 is a flowchart illustrating a method of generating a highlighted DOF image, according to an embodiment of the present invention.

In operation 1410, a first pattern image and a second pattern image are obtained by photographing a subject that is illuminated by an illumination device according to different patterns. The illumination device may include at least one of a projector and a flash of a camera. The illumination device may be mounted on the camera or provided in the camera, or may use external light.

Each pattern of the illumination device may be a checkerboard pattern in which blocks that transmit light therethrough and blocks that don't transmit light are alternately arranged, and sizes of the blocks of the checkerboard pattern may be arbitrarily determined. Also, the different patterns may be patterns in which positions of the blocks that transmit light therethrough and the blocks that don't transmit light are reversed.

In operation 1420, a DOF region is detected by using the first pattern image and the second pattern image. The DOF region may be detected by using a difference image between the first pattern image and the second pattern image.

In operation 1430, weights to highlight the DOF region are determined. A weight image may be generated by normalizing pixel values of the difference image between the first pattern image and the second pattern image. Pixel values of the weight image may become weights for a pixel of a pattern image. After the difference image is normalized, the pixel values of the weight image may be adjusted such that the weights for a non-DOF region is reduced and the weights for the DOF region is increased.

In operation 1440, a highlighted DOF image may be generated by applying the weights determined in operation 1430 to a combined image of the first pattern image and the second pattern image. An image obtained after multiplying the weight image by the combined image composed of pixels having larger pixel values from among pixels of the first pattern image and the second pattern image at the same position may be output as the highlighted DOF image.

In operation 1450, a binary image of the highlighted DOF image may be generated, and various image processing techniques using the DOF region may be performed by using the binary image. For example, image segmentation that separates an in-focus region in the difference image between the first and second pattern images may be performed. Since the in-focus region is separated by the image segmentation, alpha matting that generates an alpha matting image which is used for natural image synthesis may be additionally performed. Also, image synthesis that combines the in-focus region with another image by using the alpha matting image in which the non-in-focus region is processed to be transparent may be additionally performed.

It may be interpreted to one of ordinary skill in the art that the block diagrams included herein show concepts of circuits for implementing principles of the present invention. Similarly, it may be understood by one of ordinary skill that arbitrary flowcharts, state transition diagrams, pseudo-codes, etc. are realized on a computer readable medium and indicate various processes that may be performed by a computer or a processor, whether the computer or the processor is clearly disclosed or not. Therefore, the embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), etc.

Functions of various components illustrated in the drawings may be related to proper software and may be provided not only via hardware capable of executing the software but also via dedicated hardware for the functions. When the functions are provided by a processor, the functions may be provided by a single dedicated processor, a single shared processor, or a plurality of individual processors that may be partially shared. Furthermore, the terms "processor" or "control unit" should not limited to indication of hardware capable of executing software and may implicatively include a digital signal processor (DSP) hardware, a read-only memory (ROM) or a random access memory (RAM) for storing the software, and non-volatile storage device without a limitation.

In claims of the present application, a component described as a means of performing a particular function includes an arbitrary method of performing the particular function, and the component may include combinations of circuit components for performing the particular function or software in an arbitrary form including a firmware or micro-codes that is/are combined with proper circuits for executing software for performing the particular function.

In the present application, the expression "an embodiment" and variations thereof mean that particular features, structures, and properties related to the corresponding embodiment is included in at least one of embodiments of principles of the present invention. Therefore, the expression "according to an embodiment" and other arbitrary variations thereof stated throughout the present application do not necessarily refer to a same embodiment.

In the present application, the expression "at least one of A and B" is used to include a case in which only the first option A is selected, a case in which only the second option B is selected, and a case in which both the options A and B are selected. In this regard, the expression "at least one from among A, B, and C" is used to include a case in which only the first option A is selected, a case in which only the second option B is selected, a case in which only the third option C is selected, a case in which the first and second options A and B are selected, a case in which the second and third options B and C are selected, and a case in which all of the first through third options A through C are selected. It would be obvious to one of ordinary skill in the art to expand application of the expressions for a larger number of options.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of generating a highlighted depth-of-field (DOF) image, the method comprising:
   obtaining a first pattern image and a second pattern image that are captured by emitting light based on patterns from an illumination device;
   detecting a DOF region by using the first pattern image and the second pattern image;
   determining weights to highlight the DOF region;
   generating the highlighted DOF image by applying the weights to a combined image of the first pattern image and the second pattern image; wherein
   the weights are applied to the combined image comprising pixels having larger pixel values, wherein the pixels having larger pixel values are obtained by comparing the pixels of the first pattern image and the second pattern image at the same position.

2. The method of claim 1, wherein the generating of the highlighted DOF image comprises:
   comparing pixels of the first pattern image and the second pattern image at the same position and generating the combined image composed of pixels having larger pixel values; and
   generating the highlighted DOF image by applying the weights to pixels of the combined image.

3. The method of claim 2, wherein the detecting of the DOF region comprises generating a difference image between the first pattern image and the second pattern image,
   the determining of the weights comprises generating a weight image by normalizing the difference image, and
   the generating of the highlighted DOF image comprises multiplying pixels of the combined image by respective pixels of the weight image.

4. The method of claim 1, further comprising:
   generating a binary image of the highlighted DOF image; and
   additionally performing predetermined image processing on the highlighted DOF image by using the binary image.

5. The method of claim 4, wherein the predetermined image processing comprises at least one of image segmentation, alpha matting, and image synthesis using the binary image.

6. The method of claim 1, wherein the illumination device comprises at least one of a projector and a flash of a camera.

7. The method of claim 1, wherein the obtaining of the first pattern image and the second pattern image comprises obtaining the first pattern image and the second pattern image by directly emitting light to the patterns from the illumination device.

8. The method of claim 1, wherein the obtaining of the first pattern image and the second pattern image comprises obtaining the first pattern image and the second pattern image by emitting light to pass through a film that is disposed in front of the illumination device, has the patterns, and is formed of a light-transmissive material.

9. The method of claim 1, wherein each of the patterns comprises a checkerboard pattern in which blocks that transmit light therethrough and blocks that block light are alternately arranged, and sizes of the blocks are arbitrarily determined.

10. The method of claim 1, wherein the patterns comprise positions of blocks that transmit light therethrough and blocks that block light that are reversed.

11. The method of claim 3, wherein the determining of the weights comprises generating a weight image by dividing the difference image by a maximum value of the difference image, and reducing weights for a non-DOF region and increasing weights for the DOF region in the difference image.

12. An apparatus configured to generate a highlighted DOF (depth-of field) image, the apparatus comprising:
    an illumination device configured to emit light based on patterns;
    a pattern image obtaining unit configured to obtain a first pattern image and a second pattern image that are captured by using the illumination device; and
    a highlighted DOF image generating unit configured to generate the highlighted DOF image by detecting a DOF region by using the first pattern image and the second pattern image, determining weights to highlight the DOF region, and applying the weights to a combined image composed of pixels having larger pixel values, wherein the pixels having larger pixel values are obtained by comparing the pixels of the first pattern image and the second pattern image at the same position.

13. The apparatus of claim 12, configured to generate a binary image of the highlighted DOF image and perform additional image processing on the highlighted DOF image by using the binary image,
    wherein the additional image processing comprises at least one of image segmentation, alpha matting, and image synthesis using the binary image.

14. The apparatus of claim 12, wherein the illumination device comprises at least one of a projector and a flash of a camera,
    wherein each of the patterns comprises a checkerboard pattern in which blocks that transmit light therethrough and blocks that block light are alternately arranged, and the patterns are two patterns in which positions of the blocks that transmit light therethrough and the blocks that block light are reversed.

15. The apparatus of claim 13, wherein the highlighted DOF image generating unit generates weights by dividing a difference image by a maximum value of the difference image, and reducing weights for a non-DOF region and increasing weights for the DOF region.

16. The apparatus of claim 12, wherein the highlighted DOF image generating unit is configured to select a pixel having a larger pixel value among pixels of the first pattern image and the second pattern image at the same position and multiplying the weights on a pixel by pixel basis by the larger pixel value of the selected pixel.

17. The apparatus of claim 12, wherein the highlighted DOF image generating unit is configured to highlight only subjects in the DOF region in response to subjects overlapping with another.

18. The method of claim 1, further comprising determining the DOF region from the highlighted DOF image based on a difference image between the first pattern image and the second pattern image.

19. The method of claim 1, further comprising separating the DOF region from other regions by thresholding a difference image between the first pattern image and the second pattern image with a predetermined threshold value.

* * * * *